Patented Feb. 24, 1948

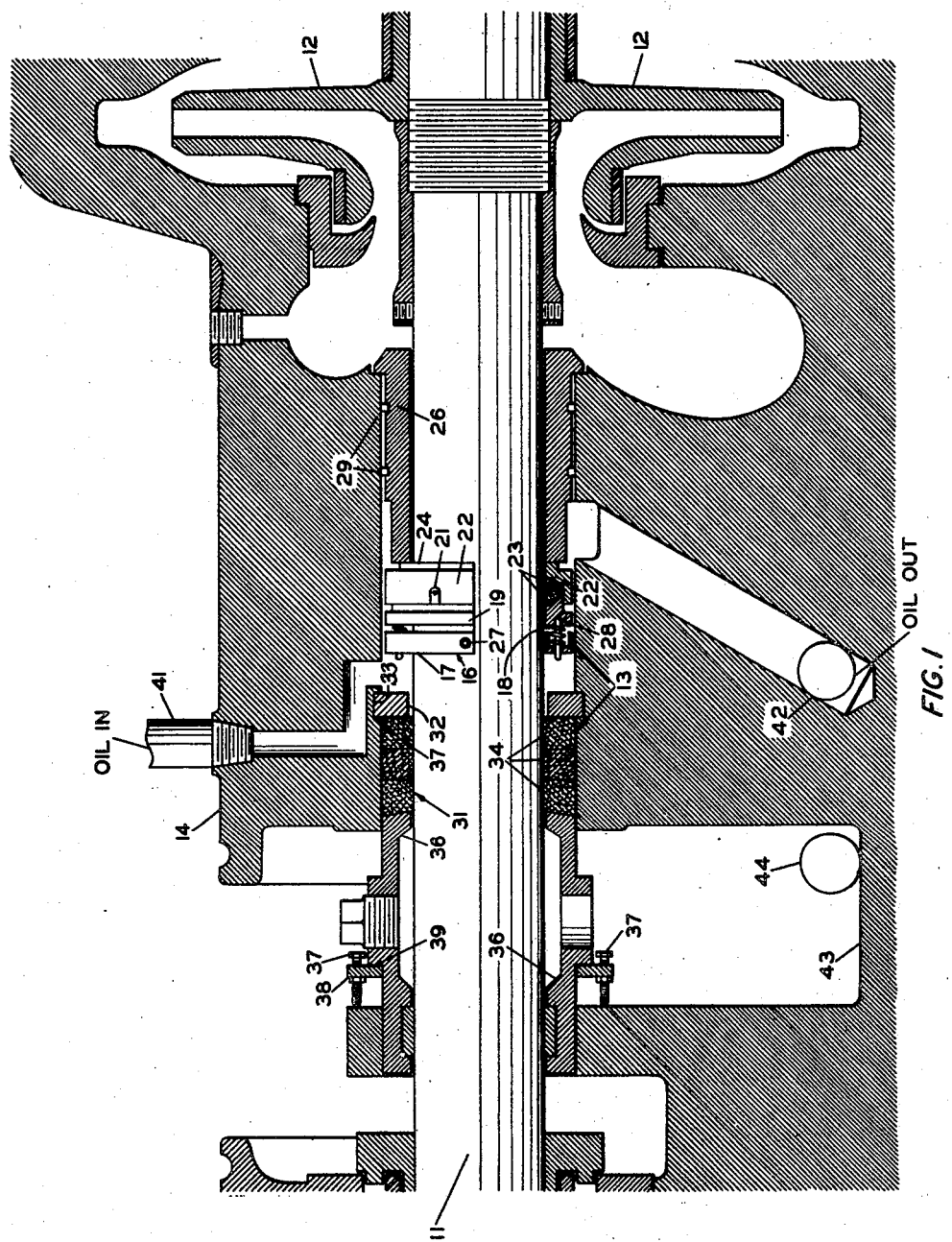

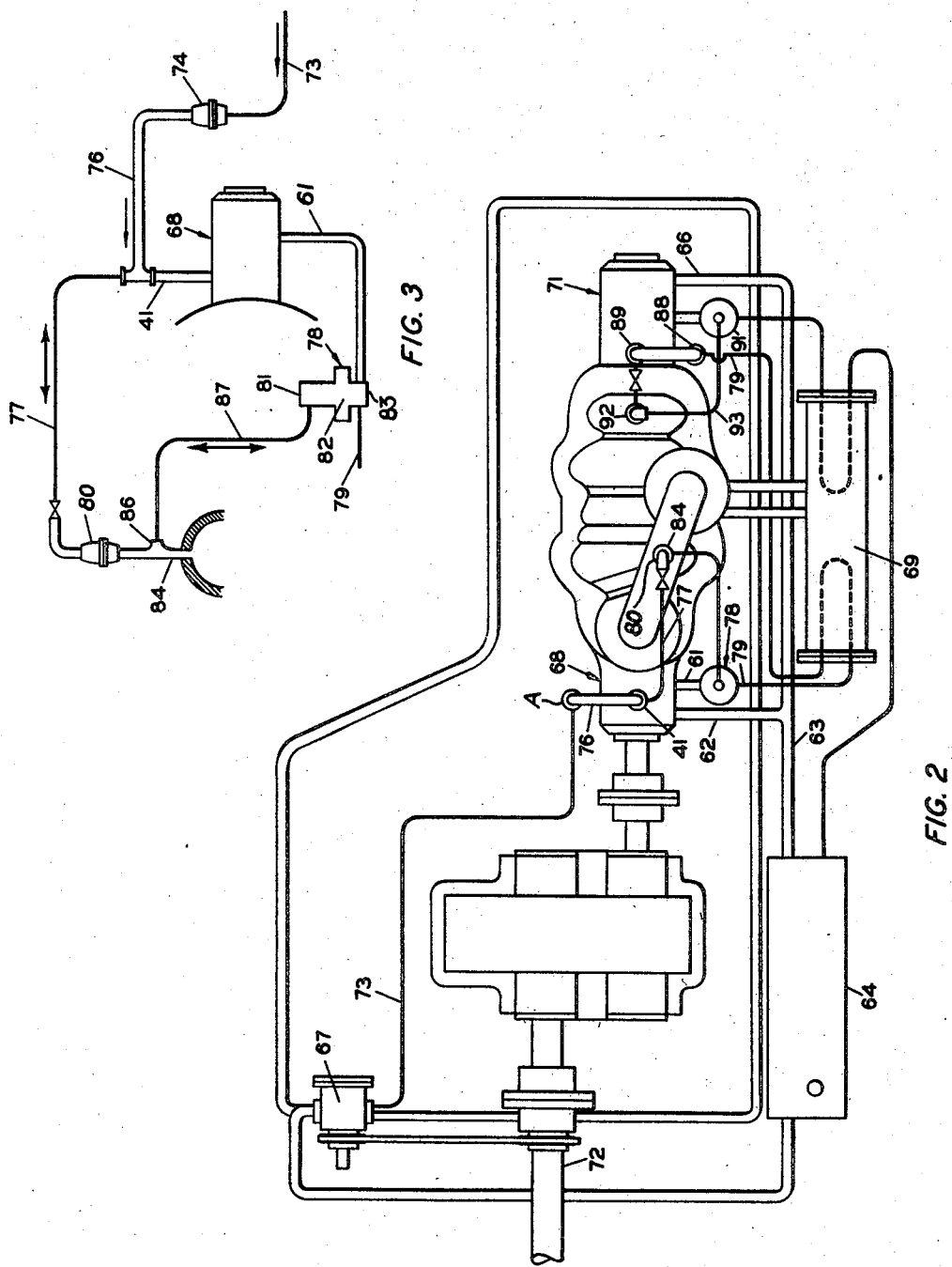

2,436,514

UNITED STATES PATENT OFFICE 2,436,514

MECHANICAL SEAL FOR CENTRIFUGAL PUMPS

Gerald P. Jennings, Bartlesville, Okla., assignor to Phillips Petroleum Company, a corporation of Delaware Application November 26, 1945, Serial No. 630,955

2 Claims. (Cl. 103—111)

This invention relates to mechanical seals for centrifugal pumps. In one of its more specific aspects it relates to a mechanical seal for high pressure centrifugal pumps and a method for operating pumps under high pressure conditions.

At the present time there are several mechanical seals on the market but none are suitable for high pressure service in petroleum or petroleum products pipeline pumps. Single seal pumps may be used only for pumping at relatively low pressures.

On double seal pumps now on the market there are two seals in the packing unit, an inner seal and an outer seal. A sealing fluid, frequently termed "seal oil," is forced by a small high pressure pump into the space between these inner and outer seals. On commercial double seal installations a separate electric motor is used to drive the circulating seal oil pump. These small auxiliary pumps are designed and operated to maintain a higher pressure on the circulating seal oil than the output pressure of the centrifugal pumps. Thus, seals are functioning properly when the (seal oil) pressure is greater outside the main centrifugal pump than inside so that the sealing mechanism is held tightly in place by external pressure. In cases of power failure when the seal oil pump stops, the seal oil pressure drops to zero and the pressure then on the mechanical seal is reversed from, for example, 50 pounds pushing toward the main pump to 1,000 pounds in the opposite direction. Such conditions are fatal to seals.

One object of my invention is to provide a double seal sealing or packing assembly wherein the seal oil circulating pump is operated independently of any exterior source of power.

Another object of my invention is to provide a sealing assembly and method of equalization of pressures so that the seal oil circulating pump may be driven off the shaft which operates the main centrifugal pump.

Still another object of my invention is to provide a seal for use on centrifugal pumps operating at pressures in the region of 1,000 pounds per square inch or more.

Still other objects and advantages will be apparent to those skilled in the art from a careful study of the following description which taken in conjunction with the attached drawing, forms a part of this specification.

In the drawing,

Figure 1 is a diagrammatic cross section of the drive end of a centrifugal pump showing my improved packing.

Figure 2 is a plan view of a centrifugal pump assembly equipped with a seal oil pump and illustrating the seal oil flow tubes and pipes and pressure equalization system.

Figure 3 illustrates in some detail the piping for the seal oil pressure equalization and maintenance in my double seal packing assemblies.

Referring now to Figure 1 of the drawing, a centrifugal pump impeller shaft 11, carrying an impeller 12 at one end, passes through a stuffing box 14 containing my novel double seal packing assembly 13.

Long distance pipe lines used for the transportation of liquids ordinarily operate at relatively high pressures, for example, as high as 1,000 pounds per square inch. Single seal packings have failed in such high pressure pumps. Double seal packings were introduced, but these still do not entirely solve pipeline centrifugal pump packing problems as evidenced by the frequent need for replacements.

One such double seal packing assembly which functions well for intermediate pressures is composed of two unit assemblies similar to a packing assembly 16 shown in Figure 1. This single unit is composed of a collar 17, some compression springs 18, a compression ring 19 having a drive pin 21, a seal ring 22 and two rings of shaft packing 23. The seal ring 22 has a hardened bearing or sealing surface 24 which is in direct contact with one end of a bronze bushing 26. One or more set screws 27 hold the collar 17 firmly to the shaft so that as the shaft rotates so does the collar. Since the compression spring pins 28 fit tightly into openings in the compression ring 19, it is obvious that this compression ring will rotate also. In addition, the drive pin 21 fits in a slot in the seal ring so that this latter ring rotates. The seal ring surface 24 is a very hard and polished surface, such as a stellite surface, and is intended to make a fluid tight contact with the end of the bronze bushing 26. This latter member is held rigid and non-rotatable by the washers or sealing ring members 29; thus, as the shaft rotates, the packing assembly 16 rotates maintaining a fluid tight seal at the stellite-bronze bushing contact surface.

The two single unit assemblies are placed on the shaft in an "opposed" manner, that is, the collars 17 are adjacent each other. In this manner, the bearing or sealing surface 24 becomes an inner seal and a similar surface placed oppositely as just mentioned becomes an outer seal. Both these assemblies are placed within a stuffing box and a seal oil under pressure circulated through the box. This oil is maintained at a few pounds higher pressure than the pump casing pressure so that the bearing surface 24 has only to withstand a few pounds pressure differential. For example, if the pump pressure is 100 pounds per square inch, then the seal oil in the stuffing box may, for example, be maintained at 110 pounds pressure. Thus, the inner seal only withstands 10 pounds pressure differential.

However, the outer seal member pressure differential is 110 pounds since the exterior pressure is atmospheric.

The commercialy available double seal packing equipment easily withstands a pressure differential of 110 pounds, some seals withstand pressures as high as 300 to 400 pounds per square inch without excessive wearing between the outer stellite surface and its gland insert member, which latter contacts the stellite surface in a fluid-tight manner. When centrifugal pumps are operating at pressures as high as 1,000 pounds per square inch and seal oil pressures must be, for example 1,050 pounds per square inch, such a contact surface as that hereinbefore described will wear excessively between this seal oil pressure and atmoshperic pressure.

My invention is intended to solve such a problem. According to my invention I use a double seal packing assembly, one seal being such as that described in relation to Figure 1. This seal is the inner seal. As the outer seal, I merely use a conventional type of ring packing and make provision for tightening of this packing by a common type of packing gland.

This combination will be better understood by reference to Figure 1 which illustrates my packing combination. The inner seal packing is as has been hereinbefore described. The outer seal portion, referred to broadly by reference numeral 31, is composed of a ring member 32 which is carefully fitted into a slot 33. Several rings of packing material 34 are inserted as shown. Following these rings is a gland member 36 for compressing the packing rings against the ring member 32 which compression also makes a tight contact between these rings and the shaft. This packing is "tightened" by turning in a proper direction some bolts 37 which force movement of a ring 38 against a shoulder 39 of the gland 36.

Seal oil enters the stuffing box from an "oil in" line 41 and leaves through a slot 42 marked "oil out." This slot 42 is, of course, connected with an outlet pipe, shown in Figure 2 (reference numeral 61).

When the packing rings 34 are tightened by the gland member 36 as tight as is practical without danger of overheating, seal oil at a pressure of 1,050 pounds per square inch will of course leak through to some extent. Obviously, the greater the leakage at this point the less is the danger of overheating. The extent of leakage will be limited by the ability of the seal oil pump to maintain a proper pressure within the stuffing box.

Leakage seal oil accumulates in an oil sump 43 from which it flows by gravity through an opening 44 into some drain pipes 62 and 66 (see Figure 2) from which it flows through a further pipe 63 into a seal oil tank 64.

In the operation of a high pressure centrifugal pump employing my packing combination I have found that such packings or seals have lasted for relatively long periods of time as compared to service periods of the commercially available double seals. When using my combination of metallic seal and ring packing in high pressure centrifugal pump service, for example, for the transfer of petroleum products at a pipeline pressure of 1,000 pounds per square inch, I maintain the seal oil at a pressure about 50 pounds greater than the pump discharge pressure, that is, about 1,050 pounds. In this manner the metallic sealing unit 16 is maintained in direct metal-to-metal contact with the bronze bushing member 26 at the surface 24. The pressure maintaining this contact, as hereinbefore mentioned, is 1,050 pounds less 1,000 pounds pump pressure or merely 50 pounds per square inch. A pressure of this magnitude is sufficient to maintain a sealing contact and yet is not sufficiently great as to cause excessive wear between these two surfaces. Any leakage therebetween will be in the direction of the pump impeller and will permit flow of seal oil from the stuffing box into the pump volute. Such leakage will tend to lubricate the leaking surfaces and to prevent or at least to retard further wear. However, leakage of seal oil means loss of seal oil, and such loss increases cost of operation.

As mentioned hereinbefore, when using an outer seal of this metallic type, the pressure differential on the metal-to-metal surface is 1,050 per square inch since the exterior is at atmospheric pressure. I have found that regardless of the smoothness and trueness of the contacting surfaces, and of the type of seal oil used wear is excessive and both gland insert and metallic packing have to be replaced at frequent intervals.

In the operation of my packing combination, I have found that 1,050 pounds seal oil pressure causes leakage through the packing rings or between the packing rings and the shaft, the latter being the more probable since the packing rings do not rotate with the shaft. Since there is friction between the rotating shaft and the packing rings, some heat is generated and this effect is evidenced by a temperature rise in the seal oil which accumulates in the sump 43. In like manner the seal oil which passes from the stuffing box through the "oil out" slot 42 also experiences a rise in temperature; at times it is considered advisable to cool this oil before recirculating.

Figure 2 illustrates the seal oil flow from its pressuring pump 67 through the high pressure stuffing box 68, a cooler 69, a low pressure stuffing box 71 and into the small storage or run tank 64. Specifically, the seal oil pump 67, powered by a direct drive from the pump drive shaft 72, forces oil under a pressure of about 1,050 pounds per square inch through a high pressure tube 73 (see Figure 3), a ball check valve 74 (marked A in Figure 2), a pipe 76 and downward through the "oil in" pipe 41 (see Figure 1) and into the high pressure stuffing box 68. This high pressure oil does not flow through tube 77 since on account of a ball check valve 80 which checks such flow. The oil then passes through this stuffing box and out through the "oil out" tube 61 and into a differential relief valve 78 at the point shown in Figure 3. This relief valve is set to maintain a pressure differential of 50 pounds per square inch between the inlet oil from tube 61 and the outlet oil in a tube 79. This pressure differential of 50 pounds or any other pressure differential desired is obtained through the proper adjustment of the compression in a compression spring 81. The pressure of this spring pushing downward on the top of a diaphragm 82 is so adjusted that for fluid or rather seal oil to pass through the valve a pressure of 50 pounds must be exerted on the bottom of the diaphragm to raise the valve member 83 and permit flow of seal oil. The oil then leaves through the tube 79.

As mentioned hereinbefore, a pressure some greater than the centrifugal pump discharge pressure is maintained in the high pressure stuffing box in order to maintain continuous sealing of the packing member 16 to the shaft 11 and continuous contact at surface 24. Since the pump pressure is about 1,000 pounds inside the pump volute then I have made provision for transmitting this pump pressure of 1,000 pounds into the stuffing box through the equalization tube 77. In Figure 3 this detail is shown wherein a high pressure point 84 of the pump housing is tapped and liquid being pumped passes through a riser tube and T 86 through the ball and check valve 80 and tube 77. Liquid from the T 86 passes through a tube 87 into the top of the differential relief valve 78 so as to exert pressure thereon. This 1,000 pounds fluid pressure plus 50 pounds spring pressure push downward on the diaphragm 82 requiring an equal upward pressure to open the valve 83 to the flow of seal oil and it is this required pressure which determines the seal oil pressure to be maintained in the high pressure stuffing box 68. Seal oil from pipe 76 does not flow into the tube 77 and back into the centrifugal pump on account of the ball check valve 80.

Summing up this high pressure seal oil flow, the oil forced by the directly driven pump 67 passes through the high pressure stuffing box 68 at a pressure about 50 pounds higher than the pressure at this end of the pipe line pump, this pressure differential being determined by the spring setting of the differential relief valve 78.

From the outlet side 79 of this relief valve 78 the seal oil passes by way of tube 79 through the cooler 69 and thence on through a ball check valve 88 and through the downflow pipe 89 into the top of the low pressure stuffing box 71. In this stuffing box are two packing units, one similar to the metallic packing unit 16 and the other a ring packing unit similar to the unit 31 of Figure 1. The pump volute adjacent the stuffing box 71 is tapped at point 92 and a riser pipe, a ball check valve, an equalizer tube similar to tube 87 of Figure 3, installed. This entire low pressure stuffing box-pressure equalization-ball check valves, etc., assembly, is similar to that used at the high pressure end and illustrated in Figure 3. The pressure, herein termed "low pressure" is about 700 pounds per square inch. In a 4-stage pump of the type as sometimes used for such pipeline service as herein discussed, an inlet pressure of about 700 pounds, and an outlet pressure of about 1,000 pounds per square inch are common pressures. I use those values, however, as merely exemplary, since other pumps, or even a similar pump as the one herein illustrated, may be used in different service and at different pressures.

At this "low pressure" end the material being pumped passes through tube similar to tube 77 to maintain pressure in the stuffing box 71. A differential relief valve 91 may be similar to valve 78, and I accordingly set the spring of such a valve to operate at a 50 pound differential pressure. Then, the pressure of the seal oil in the stuffing box 71 is about 750 pounds per square inch, this oil of course coming through tube 79 from the other differential relief valve 78. This spring then causes a 50 pound pressure differential in the stuffing box 71 over that in the low pressure stage of the pump; this differential then operates to hold the metallic seal member (similar to member 16 of Figure 1) in fluid tight contact with a corresponding bronze bushing. Seal oil leakage occurring through the ring packing and passes into a drain sump and out through a drain tube 66 shown in Figure 2, which tube connects with tube 63 for drainage of oil from both ends of the pump into the seal oil tank 64, which latter is set low so as to promote gravity drainage.

The seal oil passing from the low pressure stuffing box 71 may become heated somewhat and after passing through the corresponding differential relief valve 91 it is cooled in the cooler 69 and then passed to the recirculation storage tank 64.

For starting up such a pump-seal oil system, I prefer to run the pump idle for a sufficient length of time that the two stuffing boxes and all pipes and tubes and the two differential relief valves become entirely filled with the sealing oil. This portion of the operation, however, only requires several minutes of time. The pump is then shut down, and while not running, is opened up very slowly to the "line" containing the material to be pumped. The liquid then fills the pump housing and flows through the check valves 80 and 92, through the respective pressure equalization tubes. In case the liquid is already being pumped in the pipe line, this pump will then become filled with said liquid at the existing pipeline pressure. Fluid will then back up from the gooseneck point 84 (see Figures 2 and 3) through the T 86 into tube 87 until the spring portion of the relief valve becomes filled at pipeline pressure. The liquid also backs up through the relief valve 78 and tube 77 until the pressure on the seal oil extending from check valve 74, in lines 76 and 41, stuffing box 68, and pipe 61 becomes equal to the pipeline pressure, or, in other words, the pressure within this portion of the seal oil system has become equalized with the pipeline pressure.

In a similar manner the pipeline fluid backs up from the low pressure end of the pump through the check valve 92 to the down pipe 89 and through the tube 93 to the differential pressure valve 91, and these parts all come to pipeline pressure.

When these procedures as just described have been followed, the pressure in both stuffing boxes is equal to the pressure in the pump housing and accordingly no differential between these pressures exists tending to compress or to separate the bronze surface and the stellite surface of the metallic packing member (16) in either stuffing box.

I now turn on the main source of power, and the pump shaft and impellers and the seal oil pump begin to function. Then as the pressure begins to rise in the high pressure end of the main pump the seal oil pressure also rises. After only a very short period, in fact a few seconds of time, the pressure in the seal oil system up to the first differential valve 78 becomes stabilized at about 1,050 pounds when the main pump discharge pressure reaches about 1,000 pounds. Then also the seal oil pressure in the low pressure end of the seal oil system reaches a value of about 750 pounds as the pressure of the first and low pressure stage reaches 700 pounds.

Thus after the pump is on the line the pressure in each stuffing box is about 50 pounds per square inch higher than in the adjacent pump stages. The selection of this 50 pound differential pressure is, of course, an arbitrary selection since, under some conditions, it might be advisable to reduce this differential or even to increase it, the main point being to maintain a higher pressure in either stuffing box than in the adjacent portion of the pump.

When such a (pipeline) high pressure centrifugal pump is in service, it is obvious to those skilled in the operation of such pumps that packing and attendant problems are frequently critical. For example, if the seal oil pump were powered by an external source of power, as for example, by an independently driven electric motor, then in case this motor should fail, due to power failure or other cause, the seal oil pressure immediately drops to zero pounds, and the main metallic seals are of course instantaneously broken. Under such conditions the pumps must be taken down and repacked. Such main pumps are frequently powered by large gas engines or the like. I have found that in, for example, pipeline operation that through uncontrollable electrical, wind and rain storms electric power failures at isolated pump stations are rather common occurences. By the use of my invention involving the pressure equalization lines from the pump housing to the stuffing boxes and my improved packings, I have found that difficulties resulting from such power failures and from many other causes are markedly reduced. By my direct driving of the seal oil circulating pump off the main pump shaft, the only time the seal oil pump will cease to function is when the main pump stops—and when this occurs and the seal oil pressures drop to zero, then the remaining pipeline pressures are transmitted by my equalization lines to the stuffing boxes and the very important metallic seals are not broken, and repacking jobs are not then necessary.

The seal oil pump may be belt driven or gear driven from the main shaft, as desired, the main consideration being to make provision that the seal oil pump operate at all times as long as the main pump is operating. Then at any time upon failure of seal oil pressure the equalization tubes function to transmit pump housing pressures to the stuffing boxes to prevent destruction of the packing assemblies.

In the above description, pump pressures of 700 and 1,000 pounds per square inch were discussed. These values were given only as exemplary, as my invention is equally applicable to pumps operating under higher or under lower pressures.

When using my pressure equalization methods, it is not absolutely necessary to drive the seal oil pump directly off the main pump shaft since a drop in seal oil pressure below the main pump pressure is immediately equalized and pump packings are not destroyed nor seals broken. However, under such conditions the main pump must be shut down unless the seal oil pump can be immediately started again. I have found that such seal oil pump stoppages are much less frequent when these pumps are driven directly from the main pump shaft, and I accordingly prefer to operate these pumps in this manner.

Having disclosed my invention, I claim:

1. In a high pressure pipe transportation system in which a liquid is pumped by a multistage centrifugal pump having two dual packing assemblies, one assembly adapted to seal the high pressure end of the pump volute and the other assembly adapted to seal the low pressure end of the pump volute, and each packing assembly consisting of an inner metal-to-metal seal and an outer packing ring seal and each packing assembly disposed in a stuffing box containing seal oil, the method of maintaining in a sealed and leakproof condition said metal-to-metal inner seal comprising passing seal oil through the stuffing box at the high pressure end of the pump volute at a pressure greater than the high pressure stage discharge pressure, reducing the pressure on the seal oil and subsequently passing said seal oil through the low pressure stuffing box at the low pressure end of the pump volute at a pressure above the discharge pressure of the low pressure stage of the centrifugal pump, and cooling the oil prior to passage through either stuffing box.

2. A multistage centrifugal pump in a pipeline having hydrostatic pressure therein, said pump having a body, a rotor in said body, a low pressure bearing in said body supporting one end of said rotor, a high pressure bearing in said body supporting the other end of said rotor, a source of lubricant liquid for said bearings, drive means to rotate said rotor, a lubricant pump driven by said drive means, conduit means connecting said lubricant pump and said bearings and disposed so that liquid lubricant from said source is pumped first to said high pressure bearing and then to said low pressure bearing in series, and then returned to said source, a first differential relief valve controlling flow in said conduit from said high pressure bearing to said low pressure bearing in response to the discharge pressure in the last high pressure stage of said multistage pump so that lubrication is maintained in said high pressure bearing as long as said lubricant pump operates, a second differential relief valve controlling flow in said conduit from said low pressure bearing to said source in response to the discharge pressure in the first low pressure stage of said multistage pump so that lubrication is maintained in said low pressure bearing as long as said lubricant pump operates, and a pipe directly connecting said pump casing and each of said bearings through a check valve for placing said hydrostatic pressure of said pipe line on the lubricant in said bearings upon failure of said lubricant pump to maintain a greater pressure thereon.

GERALD P. JENNINGS.

REFERENCES CITED

The following references are of record in the file of this patent:

UNITED STATES PATENTS

| Number | Name | Date |
|---|---|---|
| 811,833 | Emmet | Feb. 6, 1906 |
| 1,553,168 | Isom | Sept. 8, 1925 |
| 2,128,744 | Hornschuch | Aug. 30, 1938 |
| 2,366,629 | Kohler | Jan. 2, 1945 |
| 1,841,863 | Van Rijswijk | Jan. 19, 1932 |
| 2,347,751 | Reeves et al. | May 2, 1944 |